United States Patent
Bülow

(10) Patent No.: US 8,855,504 B2
(45) Date of Patent: Oct. 7, 2014

(54) OPTICAL TRANSMISSION METHOD AND OPTICAL RECEIVER

(75) Inventor: Henning Bülow, Kornwestheim (DE)

(73) Assignee: Alcatel Lucent, Boulogne-Billancourt (FR)

( * ) Notice: Subject to any disclaimer, the term of this patent is extended or adjusted under 35 U.S.C. 154(b) by 2172 days.

(21) Appl. No.: 10/873,359

(22) Filed: Jun. 23, 2004

(65) Prior Publication Data

US 2005/0041986 A1   Feb. 24, 2005

(30) Foreign Application Priority Data

Aug. 18, 2003 (EP) .................................. 03292040

(51) Int. Cl.
 - H04B 10/00 (2013.01)
 - H04L 25/03 (2006.01)
 - H04B 10/69 (2013.01)
 - H04B 10/2507 (2013.01)

(52) U.S. Cl.
CPC ...... H04B 10/6971 (2013.01); H04L 25/03006 (2013.01); H04B 10/697 (2013.01); H04L 2025/03789 (2013.01); H04B 10/2507 (2013.01)
USPC ........... 398/209; 398/208; 398/210; 398/211; 398/158; 398/159

(58) Field of Classification Search
USPC ..................... 398/149, 54, 208–211, 159, 154
See application file for complete search history.

(56) References Cited

U.S. PATENT DOCUMENTS

| | | | | |
|---|---|---|---|---|
| 4,747,094 A | * | 5/1988 | Sakaguchi et al. | 398/101 |
| 5,127,051 A | * | 6/1992 | Chan et al. | 375/348 |
| 5,434,883 A | * | 7/1995 | Kimoto et al. | 375/231 |
| 5,541,956 A | * | 7/1996 | Ueda | 375/232 |
| 5,579,016 A | * | 11/1996 | Wolcott et al. | 342/378 |
| 5,726,965 A | * | 3/1998 | Hajjar et al. | 369/53.33 |
| 5,809,086 A | * | 9/1998 | Ariyavisitakul | 375/332 |
| 5,815,536 A | * | 9/1998 | Abe | 375/344 |

(Continued)

FOREIGN PATENT DOCUMENTS

| | | |
|---|---|---|
| EP | 0 812 075 A2 | 12/1997 |
| WO | WO 02/19001 A2 | 3/2002 |
| WO | WO 02/43340 A2 | 5/2002 |
| WO | WO 03/077449 A1 | 9/2003 |

OTHER PUBLICATIONS

H. Yamaguchi et al, "Indoor Infrared Wireless Systems Using OOK-CDMA with Decision-Feedback Equalizer on Diffuse Channels", IEICE Transactions on Communications, Institute of Electronics Information and Comm. Eng., Tokyo, Japan, vol. E84-B, No. 4, Apr. 2001, pp. 960-966, XP001058886.

(Continued)

*Primary Examiner* — Danny Leung
(74) *Attorney, Agent, or Firm* — Harness, Dickey & Pierce

(57) ABSTRACT

An optical receiver has an adaptive optical compensator and/or an adaptive electrical equalizer for compensating signal distortion in a received optical signal. In order to achieve a very fast adaptation of the receiver to the actual signal distortion, which is important for example for bursts mode optical signals in a packet-switched optical transmission network, at least one predetermined trainings sequence is provided in the optical signal, which is known at the receiver and thus enables fast adaptation of the compensator and/or equalizer to the actual signal distortion.

3 Claims, 1 Drawing Sheet

(56) References Cited

U.S. PATENT DOCUMENTS

| | | | |
|---|---|---|---|
| 5,870,675 A * | 2/1999 | Tuutijarvi et al. | 455/436 |
| 5,936,961 A | 8/1999 | Chiodini et al. | |
| 6,052,349 A * | 4/2000 | Okamoto | 369/47.26 |
| 6,069,720 A * | 5/2000 | Cotter et al. | 398/1 |
| 6,347,126 B1 * | 2/2002 | Nagayasu et al. | 375/344 |
| 6,385,356 B1 * | 5/2002 | Jopson et al. | 385/11 |
| 6,411,417 B1 * | 6/2002 | Roberts et al. | 398/177 |
| 6,498,670 B2 * | 12/2002 | Yamashita et al. | 398/209 |
| 6,556,345 B1 * | 4/2003 | Gassner et al. | 359/341.4 |
| 6,580,705 B1 * | 6/2003 | Riazi et al. | 370/347 |
| 6,601,007 B1 * | 7/2003 | Amir et al. | 702/107 |
| 6,628,926 B1 * | 9/2003 | van de Beek et al. | 455/75 |
| 6,684,030 B1 * | 1/2004 | Taylor et al. | 398/59 |
| 6,721,315 B1 * | 4/2004 | Xiong et al. | 370/389 |
| 6,724,526 B1 * | 4/2004 | Onaka et al. | 359/337.1 |
| 6,735,397 B2 * | 5/2004 | Herrity | 398/158 |
| 6,738,375 B1 * | 5/2004 | Okanoue | 370/389 |
| 6,771,425 B2 * | 8/2004 | Chang et al. | 359/634 |
| 6,778,782 B1 * | 8/2004 | Watley et al. | 398/147 |
| 6,782,046 B1 * | 8/2004 | Ling et al. | 375/232 |
| 6,791,995 B1 * | 9/2004 | Azenkot et al. | 370/436 |
| 6,870,858 B1 * | 3/2005 | Sebire | 370/514 |
| 6,871,024 B2 * | 3/2005 | Nishimoto et al. | 398/159 |
| 6,898,379 B2 * | 5/2005 | Lenosky et al. | 398/149 |
| 6,940,924 B1 * | 9/2005 | Kim et al. | 375/340 |
| 6,961,314 B1 * | 11/2005 | Quigley et al. | 370/252 |
| 6,965,616 B1 * | 11/2005 | Quigley et al. | 370/480 |
| 6,967,988 B1 * | 11/2005 | Wedding | 375/142 |
| 6,987,754 B2 * | 1/2006 | Shahar et al. | 370/349 |
| 7,023,912 B2 * | 4/2006 | Orlik et al. | 375/232 |
| 7,026,700 B2 * | 4/2006 | Hanberg | 257/436 |
| 7,035,358 B1 * | 4/2006 | Sankaran et al. | 375/344 |
| 7,039,330 B2 * | 5/2006 | Lenosky | 398/208 |
| 7,050,513 B1 * | 5/2006 | Yakhnich | 375/341 |
| 7,092,437 B2 * | 8/2006 | Chen et al. | 375/231 |
| 7,103,065 B1 * | 9/2006 | Quigley et al. | 370/465 |
| 7,106,979 B1 * | 9/2006 | Taylor | 398/209 |
| 7,123,845 B2 * | 10/2006 | Matsuyama | 398/208 |
| 7,130,366 B2 * | 10/2006 | Phanse et al. | 375/350 |
| 7,139,283 B2 * | 11/2006 | Quigley et al. | 370/432 |
| 7,151,916 B2 * | 12/2006 | Lagarrigue | 455/295 |
| 7,194,025 B2 * | 3/2007 | Wood et al. | 375/231 |
| 7,203,853 B2 * | 4/2007 | Martwick et al. | 713/320 |
| 7,218,671 B2 * | 5/2007 | Jeong et al. | 375/229 |
| 7,224,911 B2 * | 5/2007 | Dai et al. | 398/209 |
| 7,242,868 B2 * | 7/2007 | Soto et al. | 398/72 |
| 7,251,297 B2 * | 7/2007 | Agazzi | 375/340 |
| 7,260,327 B1 * | 8/2007 | Shin et al. | 398/51 |
| 7,263,289 B2 * | 8/2007 | Shiomoto et al. | 398/57 |
| 7,266,310 B1 * | 9/2007 | Savory et al. | 398/205 |
| 7,277,634 B2 * | 10/2007 | Ovadia | 398/45 |
| 7,302,188 B2 * | 11/2007 | Sugihara et al. | 398/147 |
| 7,308,211 B2 * | 12/2007 | Miyazaki | 398/208 |
| 7,310,480 B2 * | 12/2007 | Maciocco et al. | 398/48 |
| 7,315,370 B2 * | 1/2008 | Barwicz et al. | 356/326 |
| 7,324,758 B2 * | 1/2008 | Marutani et al. | 398/147 |
| 7,391,975 B2 * | 6/2008 | Oettinger et al. | 398/129 |
| 7,443,914 B2 * | 10/2008 | Azenkot et al. | 375/233 |
| 2001/0028760 A1 * | 10/2001 | Yaffe | 385/27 |
| 2002/0131486 A1 * | 9/2002 | Haartsen | 375/229 |
| 2002/0187765 A1 * | 12/2002 | Kozak et al. | 455/232.1 |
| 2003/0002499 A1 * | 1/2003 | Cummings et al. | 370/389 |
| 2003/0081669 A1 | 5/2003 | Yousef et al. | |
| 2003/0103253 A1 * | 6/2003 | Bunton | 359/123 |
| 2003/0147655 A1 * | 8/2003 | Shattil | 398/182 |
| 2003/0161348 A1 * | 8/2003 | Mills et al. | 370/509 |
| 2004/0028405 A1 * | 2/2004 | Unitt et al. | 398/32 |
| 2004/0047636 A1 * | 3/2004 | Guild et al. | 398/147 |
| 2004/0114936 A1 * | 6/2004 | Sugihara et al. | 398/147 |
| 2004/0213568 A1 * | 10/2004 | Shiomoto et al. | 398/33 |
| 2004/0247246 A1 * | 12/2004 | Lee et al. | 385/48 |
| 2005/0019042 A1 * | 1/2005 | Kaneda et al. | 398/208 |
| 2005/0041986 A1 * | 2/2005 | Bulow | 398/208 |
| 2005/0105919 A1 * | 5/2005 | Sugihara et al. | 398/202 |
| 2005/0175339 A1 * | 8/2005 | Herskowits et al. | 398/1 |
| 2007/0058709 A1 * | 3/2007 | Chen et al. | 375/231 |
| 2007/0201877 A1 * | 8/2007 | Epps et al. | 398/154 |
| 2008/0002973 A1 * | 1/2008 | Yamabana et al. | 398/38 |
| 2008/0310861 A1 * | 12/2008 | Wong et al. | 398/210 |
| 2009/0142055 A1 * | 6/2009 | Qiu et al. | 398/45 |
| 2009/0148162 A1 * | 6/2009 | Tang et al. | 398/48 |

OTHER PUBLICATIONS

Bulow, "Polarization Mode Dispersion Mitigation", Encyclopedia of Telecommunications, 2002, pp. 1970-1975, XP009023927.

* cited by examiner

OPTICAL TRANSMISSION METHOD AND OPTICAL RECEIVER

BACKGROUND OF THE INVENTION

The invention is based on a priority application EP 03292040.7 which is hereby incorporated by reference.

The present invention relates to the field of telecommunications and more particularly to a method and apparatus for optical signal transmission.

Today telecommunication systems mainly rely on optical transmission in the backbone network but with signal processing and switching still being electrical. Future telecommunication networks, however, will eventually incorporate all-optical signal processing and transparent optical switching. Moreover, while today's optical transmission systems use multiplexing schemes such as time division multiplexing or wavelength multiplexing with permanent or semi-permanent bandwidth allocation, future networks are expected to employ optical packet switching and statistical multiplexing. Optical packet switching means that short optical bursts are switched on an individual basis through the network.

When an optical signal is transmitted over an optical fiber link, it is subject to signal distortion due to dispersion effects (chromatic dispersion, polarization mode dispersion) and other non-linear distortion. Optical receivers in the network are thus equipped with optical compensators and/or electrical equalizers to balance the signal distortion. Such compensators and equalizers are adjustable to allow adaptation to the actual signal distortion. A good overview over adaptive optical and electrical equalization of distorted optical signals is given in H. Bülow, "Polarization Mode Dispersion Mitigation" in J. Proakis (Ed.) "Encyclopedia of Telecommunications", 2002, Wiley, which is incorporated by reference herein.

Today, a "blind" adaptation is used, which has a feedback loop that seeks to minimize for example the bit-error rate (BER) provided by a forward-error correction (FEC) unit or maximize the eye opening in an eye diagram. Such blind adaptation, however, is very slow compared to the length of optical bursts.

In the case of transparently switched optical networks, an optical signal might be re-routed via an alternate optical link and thus experience different dispersion or might experience varying non-linear distortion in the case of changing load of optical add/drop-multiplexers. Thus adaptation within a few milliseconds or even faster would be necessary. Furthermore, in optical packet-switched networks, different optical packets on the same fiber link may come via different optical paths from different sources in the network so that adaptation to each individual optical packet within a few nanoseconds might be requested. The fast adaptation thus required is orders of magnitudes to fast for known blind adaptation schemes.

In mobile radio networks, it has been proposed to use reference signals to allow fast time and frequency synchronization, see U.S. Pat. No. 5,936,961. In this different technical field, however, one has to deal with very different technical problems at much lower bitrates as compared to optical signal transmission, such as multipath propagation, fading, power control, and signal coding.

It is thus an object of the present invention to provide an adaptation of optical compensators and/or electrical equalizers in optical receivers of an optical transmission network.

SUMMARY OF THE INVENTION

These and other objects that appear below are achieved by the use of at least one predetermined trainings sequence, which is known at the receiver and thus enables fast adaptation of the compensator and/or equalizer to the actual signal distortion.

In particular, an optical receiver for an optical transmission network contains at least one adjustable optical compensator and/or adjustable electrical equalizer for compensating signal distortions of an optical signal received from a fiber optical link. The optical compensator and/or the electrical equalizer is controlled by at least one controller, which determines from a predefined trainings sequence, received as part of the optical signal, an adjustment signal to adjust the optical compensator and/or electrical equalizer to the actual distortion of the received optical signal.

The invention provides a cost-effective solution for adaptive optical distortion compensation and thus allows to increase span length, optical signal power and signal rate in future all-optical networks and optical packet-switched networks and reduces installation costs.

BRIEF DESCRIPTION OF THE DRAWINGS

A preferred embodiment of the present invention will now be described with reference to the accompanying drawings in which.

A basic idea of the present invention is to use of a trainings sequence for optical compensation and/or electrical equalization of optical signals. A data format thus contains a trainings sequence or a known part of the signal is used as trainings sequence. Different trainings sequences may be used for optical and electrical equalizer. For example an isolated extended "1" may be used for optical compensation, while for an electrical equalizer a short sequence with a (approximately) same number of preferably alternating "0" and "1" might be more effective. It should be clear that if for example the electrical trainings sequence contains an odd number of bits like pseudo-noise sequences, it would not be possible to have as many logical "1"s as logical "0"s. It would be sufficient, if the signal has about the same number.

Figure 1:
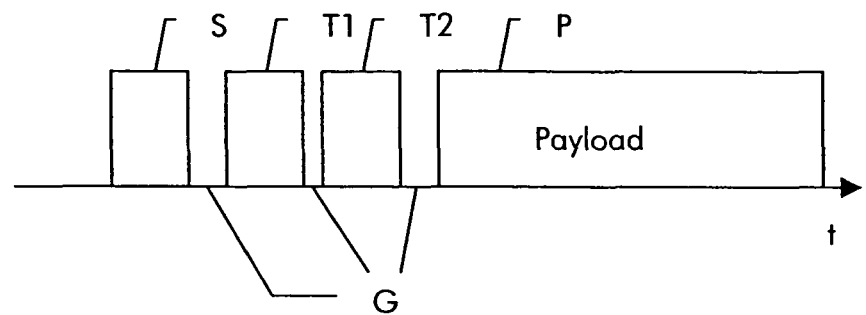
FIG. 1 shows an optical signal burst with two trainings sequences and FIG. 2 shows an optical receiver with optical compensator and electrical equalizer.

FIG. 1 shows an example of an optical packet used for the invention. The packet contains a synchronization pattern S, a first trainings sequence T1 for adapting an optical compensator, a second trainings sequence T2 for adapting an electrical equalizer and a payload section P for the transport of payload data. Preferably, synchronization pattern S, first and second trainings sequences T1, T2 and payload section P may be delimited by pauses G of predefined but not necessarily same length called guard time. The optical packet may also contain further information like source and destination addresses, preferably in the form of separate packet fields (not shown) or as part of the payload section.

Figure 2:
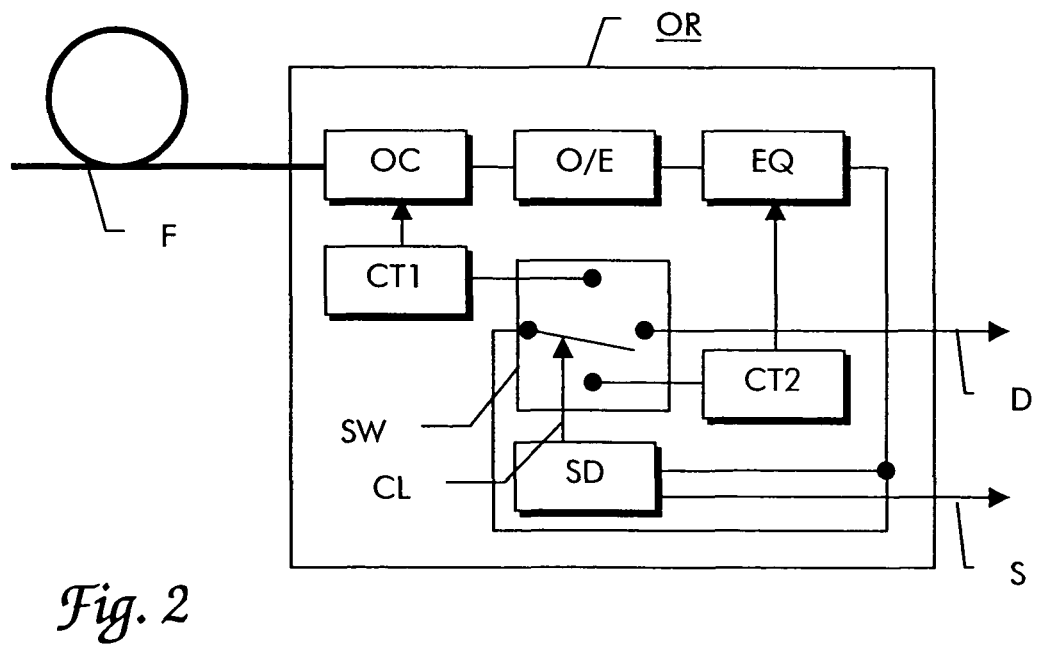

An optical receiver with adaptive optical compensator and adaptive electrical equalizer is shown in FIG. 2. The optical receiver OR is connected to a optical fiber link F and receives therefrom a transmission signal composed of optical packets as shown in FIG. 1. The received optical signal is first subject to optical compensation by adaptive optical compensator OC. The optical compensator is controlled by controller CT1. The optical signal is then fed to an optical-to-electrical converter E/O which generates a corresponding electrical signal that is then fed to adaptive electrical equalizer EQ. The electrical equalizer EQ is controlled by a second controller CT2. The equalizer is connected to a synchronization detector SD and a switch SW. The synchronization detector SD controls the switch SW via control line CL to switch the signal either to the first controller CT1, the second controller CT2 or a data output D of the optical receiver. In addition the synchronization detector SD generates a synchronization signal S. Synchronization signal S and data signal D together form the output of the receiver.

The synchronization detector S searches for a synchronization pattern in a received signal and synchronizes on a found synchronization signal. A synchronization signal indicates the beginning of a new packet. The synchronization detector knows the time difference from the synchronization signal to the first trainings sequence, to the second trainings sequence and to the payload section and controls the switch SW accordingly via control line CL so as to switch the first trainings sequence to controller CT1, the second trainings sequence to controller CT2 and the payload portion to the data output D. The guard time spans G that delimit the trainings sequences T1, T2 and the synchronization pattern allow enough time to steer the switch SW.

Controller CT1 thus receives the first trainings sequence and compares it with a scheduled sequence. From this comparison, the controller determines whether the optical compensator OC operates properly or whether it has to be adjusted. In the latter case, the controller CT1 generates an adjustment signal for the optical compensator OC.

In the same manner, the second controller CT2 receives the second trainings sequence and generates an adjustment signal for the electrical equalizer EQ to ad just it to the actual distortion of the received packet.

After having adjusted both the optical compensator OC and the electrical equalizer EQ, the optical receiver is perfectly adjusted to the actual dispersion of the optical packet and the payload portion thus in perfectly compensated condition.

The electrical equalizer can be implemented for example by a feed-forward equalizer (FFE) followed by a decision feedback equalizer (DFE) as described in the above mentioned article by the inventor. The optical compensator is for example an electrically tunable polarization controller (PC) e.g. based on the electro-optic effect in Lithium Niobate, on the elasto-optic effect used in fiber squeezer devices or on liquid crystal technology.

The invention is well suited for optical receivers at bitrates of 2.5 G up to 40 Gb/s or even above in future application but also for existing optical networks for the Synchronous Digital Hierarchy (SDH) or the Optical Transport Network (OTN) or Gigabit-Ethernet. A receiver according to the invention can be implemented in any type of network equipment, such as repeaters, regenerators, and other type of electrical network elements terminating an all-optical link.

Having described a preferred embodiment of the invention, it has to be noted that various changes, alterations, and substitutions can be made without departing from the spirit and concepts of the present invention. The preferred embodiment shows both, an electrical equalizer and an optical compensator. It should be understood, however, that the invention could rather be carried out with only an equalizer or only a compensator or with any other known adjustable compensation means for distorted optical signal In the preferred embodiment, a packet with synchronization pattern and optical trainings sequence, electrical trainings sequence and payload field delimited by guard time spans has been shown. Other packet formats, however may also be possible. For example, the same trainings sequence may be used for optical and electrical adaptation. Moreover, the trainings sequence can be located in a predefined position in the middle or at the end of the payload section. In this case, the packet would have to be temporarily stored, the equalizer than adapted the stored packet equalized afterwards. This can preferably be used for signal electrical equalization. Guard bands are not required in this alternative. In a further improvement, the synchronization pattern or part thereof or other portions of the optical packet, which are provided for any other purpose in the packet, can be re-used as trainings sequence, as well.

The invention claimed is:

1. An optical receiver for an optical transmission network comprising:
    an adjustable optical compensator or an adjustable electrical equalizer for compensating signal distortions of an optical signal received from a fiber optical link,
    the receiver further comprising at least one controller for determining from a predefined trainings sequence, received as part of the optical signal, an adjustment signal to adjust the optical compensator and electrical equalizer to the actual distortion of the received optical signal by comparing said at least one received trainings pattern and at least one stored scheduled pattern;
    wherein said optical signal is a burst mode optical signal comprising at least one optical packet being structured according to an optical packet format used in said optical transmission network;
    wherein said optical packet format comprises:
    a synchronization pattern,
    a payload section, and
    at least one trainings sequence;
    wherein said controller is configured to locate said trainings sequence within a received optical packet at a predefined time span from the synchronization pattern and to determine said adjustment signal from said at least one trainings sequence received as part of an optical packet,
    wherein the predefined trainings sequence is used for compensating the signal distortions per the at least one optical packet, and
    wherein said at least one trainings sequence serves for adjusting an optical compensator for compensating signal distortions of an optical signal in said format.

2. An optical receiver for an optical transmission network comprising:
    an adjustable optical compensator or an adjustable electrical equalizer for compensating signal distortions of an optical signal received from a fiber optical link,
    the receiver further comprising at least one controller for determining from a predefined trainings sequence, received as part of the optical signal, an adjustment signal to adjust the optical compensator and/or electrical equalizer to the actual distortion of the received optical signal by comparing said at least one received trainings pattern and at least one stored scheduled pattern;
    wherein said optical signal is a burst mode optical signal comprising at least one optical packet being structured according to an optical packet format used in said optical transmission network;
    wherein said optical packet format comprises:
    a synchronization pattern,
    a payload section, and
    at least one trainings sequence;
    wherein said controller is configured to locate said trainings sequence within a received optical packet at a predefined time span from the synchronization pattern and to determine said adjustment signal from said at least one trainings sequence received as part of an optical packet, wherein the predefined trainings sequence is used for compensating the signal distortions per the at least one optical packet, and wherein said at least one trainings sequence comprises a first trainings sequence for adjusting an optical compensator and a second trainings sequence adjusting an electrical compensator.

3. A method of compensating distortion using an Optical compensator and/or electrical equalizer in a burst mode optical transmission signal received from an optical transmission network, wherein said optical signal comprises at least one optical packet being structured according to an optical packet format used in said optical transmission network;

wherein said optical packet format comprises:
a synchronization pattern,
a payload section, and
at least one trainings sequence, and
wherein said method comprises the steps of:

detecting the synchronization pattern in said optical packet;

locating said at least one trainings pattern in said optical packet being located a predefined time span from said synchronization pattern, determining at least one adjustment signal from a comparison between said at least one received trainings pattern and at least one stored scheduled pattern;

adjusting an optical compensator or an electrical equalizer with said at least one adjustment signal, wherein the at least one trainings sequence is used for compensating the distortion per the at least one optical packet, and wherein said packet format comprises a first trainings sequence for adjusting an optical compensator and a second trainings sequence adjusting an electrical compensator.

* * * * *